United States Patent [19]
Hayes et al.

[11] 3,776,245
[45] Dec. 4, 1973

[54] MOLDED PLASTIC COMPACT WITH MIRROR MEMBER

[75] Inventors: Thomas A. Hayes, Westport, Conn.; Theodore R. Krause, Ridgewood, N.J.

[73] Assignee: VCA Corporation, Greenwich, Conn.

[22] Filed: Mar. 22, 1972

[21] Appl. No.: 237,118

[52] U.S. Cl............................................. 132/83 R
[51] Int. Cl............................................. A45d 33/00
[58] Field of Search.............. 132/83 R, 83.6, 83 E, 132/83 F, 83 D; 350/296, 295

[56] References Cited
UNITED STATES PATENTS
2,737,189  3/1956  Morningstar et al............. 132/83 R
3,527,527  7/1970  Manowitz........................... 350/295

Primary Examiner—Louis G. Mancene
Assistant Examiner—Gregory E. McNeill
Attorney—H. Gibner Lehmann and K. Gibner Lehmann

[57] ABSTRACT

A compact for holding a cosmetic product, said compact including a molded plastic case having a cover which is provided with an opening of appreciable expanse. The cover is molded with a sloped, outwardly-facing thin-walled yieldable shoulder which extends along the inside of inner edge portions of the opening so as to engage marginal portions of a mirror member which is disposed in the cover opening. The thin-walled shoulder positions of the mirror member, and can yield inward slightly in response to inward force applied to the member. This force is exerted by an ornamental cover plate that is also disposed in the opening of the cover and against the outside of the mirror member, being secured to the cover by a sonic welding operation. During such operation the mirror member is tightly clamped against the positioning shoulder of the cover, which yields slightly as a consequence of the assembly operation. By the above construction, all looseness of the mirror member is prevented, as well as the likelihood of breaking or damage to the latter.

5 Claims, 5 Drawing Figures

PATENTED DEC 4 1973
3,776,245
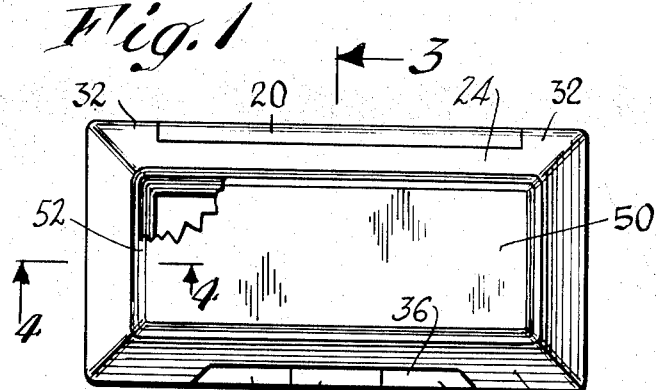
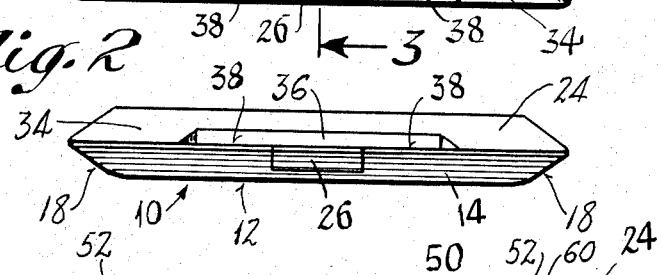
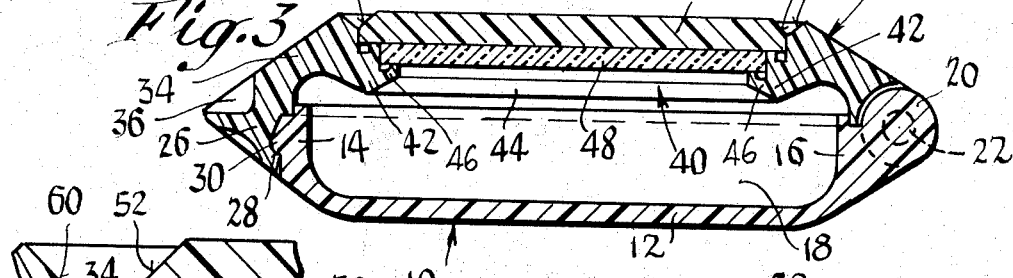
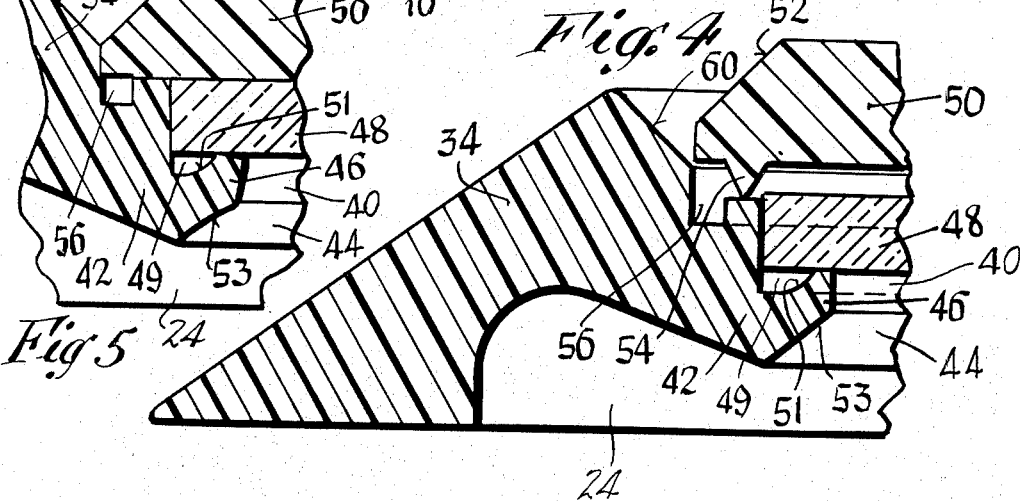

MOLDED PLASTIC COMPACT WITH MIRROR MEMBER

BACKGROUND

This invention relates to molded plastic compacts for holding cosmetic products such as face powder, rouge, and the like, and more particularly to compacts wherein a separate mirror piece or member is embodied in the construction.

Heretofore numerous types of compacts, both molded and metal, have been proposed and produced, wherein separate mirror members have been incorporated. In many cases the mirror members of such compacts have been loosely held, or else work loose after a period of use. This not only represents an annoyance to the user, but it also enables the powder or other contents of the compact to get in back of the mirror, sometimes impairing the reflecting qualities thereof and in any circumstance constituting a somewhat messy condition in that loose particles can fall out onto garments or other surfaces, causing a marring of the same. Further, looseness of the mirror member results in a greater likelihood of breakage of the same, particularly if the compact should be inadvertently dropped.

SUMMARY

The above drawbacks and disadvantages of prior compacts having mirror members incorporated in them are ovbiated by the present invention, which has for its main object the provision of an improved molded plastic compact incorporating a separate mirror member, wherein the latter is especially firmly held and supported against looseness, rattling and the like, and is also mounted in a manner to minimize the likelihood of breakage in the event that the compact should be inadvertently dropped or jarred. A related object of the invention is to provide an improved molded plastic compact with mirror member as above characterized, which is especially simple in its construction and economical to mold and assemble whereby the fabricating cost is held to an absolute minimum while at the same time resulting in a product of especially high quality. These objects are accomplished by providing a molded plastic case having a cover which encompasses an opening of appreciable expanse, in which latter there is disposed a separate mirror member. The cover has an outwardly-facing, thin-walled yieldable shoulder which extends along the inside of the opening and is adapted to engage marginal portions of the mirror member so as to constitute a stop and support for the latter. An ornamental cover plate is disposed against the outside of the mirror member, being constituted preferably of plastic and being secured to the cover as by a sonic-welding operation to hold the mirror member firmly against the shoulder of the cover. During the assemblage of the mirror and cover plate to the cover, the thin-walled yieldable shoulder of the latter is stressed and slightly deformed whereby it maintains the mirror member under continuous force or pressure, thereby preventing any looseness of the latter. Moreover, the plastic cover plate constitutes a reinforcing backing for the mirror member which, in conjunction with the uniform pressures applied to marginal portions of the member minimize the likelihood of breakage of the mirror should the compact be inadvertently dropped, severely jarred, etc.

Still other features and advantages of the invention will hereinafter appear.

In the accompanying drawings, illustrating one embodiment of the invention:

FIG. 1 is a top plan view of the improved compact as provided by the invention, with a portion of the ornamental top cover plate broken away to reveal interior details.

FIG. 2 is a front elevational view of a compact of FIG. 1.

FIG. 3 is a transverse section taken on the line 3—3 of FIG. 1.

FIG. 4 is an enlarged fragmentary sectional view of an end portion of the compact, taken on the line 4—4 of FIG. 1 and illustrating a step in the securement of the mirror member and cover plate to the compact cover.

FIG. 5 is a fragmentary sectional view like that of FIG. 4, but showing the parts after completion of the assembly thereof.

Considering first FIGS. 1—3 the compact as shown therein comprises a base or body portion designated generally by the numeral 10, said body portion having the form of a shallow, rectangular dished configuration with a bottom wall 12, front and rear walls 14 and 16 respectively, and end walls 18. The rear wall 16 has an elongate, centralized hinge trunion 20 through which a hinge pin 22 extends and from the ends of which it projects.

Hingedly secured to the body 10 is a top or cover member 24 having a centralized depending tab 26 provided with a rear horizontal indentation or groove 28 adapted to receive a forwardly projecting rib 30 provided on the front wall 14 of the body of the compact, thereby to constitute a clasp for releasably holding the cover in closed position.

As seen in FIG. 1, the cover 24 has a pair of widely spaced apart, hinge trunion portions 32 which straddle the central trunion portion 20 of the body 10 and receive the end portions of the hinge pin 22 to effect a hinged connection between the body and the cover, all in the usual manner.

The cover 24 has a sloping front wall 34 which is cut away or provided with a horizontal finger-engageable groove 36. The groove 36 exposes or reveals upper shoulder surfaces 38 of the front wall 14 of the body 10 which, when engaged by the fingers in conjunction with engagement of the finger tab 26 enables the latter to be sprung outward and forced upward in a known manner for opening the compact.

In accordance with the present invention the cover 24 is provided with a centralized opening 40 of appreciable expanse, said opening being outlined respectively by front and rear inner edge portions 42, and side edge portions 44. Bordering the opening 40 is an upwardly facing, thin-walled yieldable shoulder portion 46 which extends along the inside of the inner edge portions 42 and is adapted to engage marginal portions of a flat rectangular mirror member 48. By this invention the shoulder 46 is adapted to yield inward or downward in response to force applied to it by the mirror member 48. The cover 24 has an outwardly facing groove 49 extending along the inside of the shoulder 46 whereby there is effect a thinning of the shoulder wall and an increased yieldability of the shoulder. As seen in FIGS. 4 and 5, the shoulder 46 comprises essentially a rib having opposite, substantially parallel sides 51 and 53 the planes of which extend at an upward angle with respect to the plane of the mirror member 48.

Enclosing and covering the mirror member 48 is a cover plate 50 of rectangular configuration, preferably provided with a bevelled edge surface 52 and further having a sharp, depending sonic-weld bead 54 adapted for engagement with the inner edge portions 42, 44 of the cover. Also, there is provided a continuous rectangular groove 56 in the edge portions 42, 44, having a slightly larger outline than the sonic bead 54 of the cover plate 50.

The cover plate 50 is preferably of thermoplastic substance, as is also the cover 24 of the compact. Referring to FIG. 4, for the purpose of effecting assembly of the parts, the mirror member 48 is first placed in the opening 40 of the cover 24 so as to rest on the yieldable shoulder 46 thereof. It will be noted that the top surface of the mirror 48 is slightly above the adjoining top surface of the inner edge portions 42, 44 of the cover. The cover plate 50 is put in place with the sonic bead 54 resting on the inner edge portions 42, 44, the plate being thereby spaced a slight distance from the top surface of the mirror 48. After such positioning of the parts, a sonic welding operation is performed whereby the sonic bead 54 is melted, softened and merged with the inner edge portions 42, 44 of the cover 24. As this is accomplished, pressure is being applied to the cover plate 50 whereby it engages and forces downward the mirror 48, causing a yielding of the upwardly facing shoulder 46. The completed assembly is illustrated in FIG. 5, and will be noted that the shoulder 44 is now slightly deformed and under continual pressure from the mirror 48, which in turn is being held in place by the welded cover plate 50. As a consequence, all looseness of the mirror 48 is eliminated, and the mirror instead is firmly held and also reinforced along its entire upper surface by the cover plate 50.

During use of the compact there will be no tendency for the mirror 48 to become loose, but instead it will be retained in a tightly clamped condition as illustrated in FIG. 5. Moreover, an effective seal is established by such deformed shoulder 46 whereby loose particles of powder or dirt cannot work behind or around the mirror member 48 so as to impair the reflecting qualities thereof. Due to the firm, reinforced mounting of the mirror member it will not be so likely to break or crack if the compact should be dropped or severely jarred.

The cover 24 has a bevel 60 bordering the opening 40 thereof, said bevel extending along the bevelled edge 52 of the cover plate and defining therewith an exposed ornamental groove outlining the plate.

It will now be seen that by the above construction there is had an extremely simple yet quick and effective, economical mounting of a mirror in the cover of a compact, at an extremely low cost. The cover plate 50 can have various ornamental surface markings so as to constitute an ornamental top panel of the cover 24, while at the same time serving to strongly reinforce the mirror member 48 and secure the latter in the proper, desired position in the cover.

Variations and modifications are possible without departing from the spirit of the invention.

I claim:

1. A compact for holding a cosmetic product, comprising in combination:
   a. a molded plastic case having a cover provided with an opening of appreciable expanse,
   b. said opening being outlined by inner edge portions of the cover,
   c. a mirror member disposed in said opening of the cover,
   d. said cover having an outwardly-facing, thin-walled yieldable shoulder extending along the inside of said inner edge portions to engage marginal portions of said mirror member,
   e. said shoulder comprising a thin wall which deforms and yields inward in response to force applied to it by the mirror member, and
   f. a cover plate disposed against the outside of the mirror member and secured to the cover, forcing the mirror member against said shoulder, thereby deforming the latter so that the mirror is securely held against looseness.

2. A compact as in claim 1, wherein:
   a. the cover has an outwardly extending rib disposed on said inner edge portion and surrounding said shoulder,
   b. said rib engaging edge portions of the cover plate and positioning the latter in overlying relationship to and in engagement with said mirror member.

3. A compact as in claim 2, wherein:
   a. said cover plate has a bevelled outer edge,
   b. said cover being a bevel bordering the opening thereof, said bevel extending along the bevelled edge of the cover plate and defining therewith an exposed ornamental groove.

4. A compact as in claim 1, wherein:
   a. the cover has an outwardly facing groove extending along the inside of said shoulder,
   b. said groove effecting a thinning of the shoulder wall and an increased yieldability of said shoulder.

5. A compact as in claim 4, wherein:
   a. said thin wall being constituted as a rib having opposite, substantially parallel sides,
   b. the planes of said sides extending at an upward angle with respect to the plane of the mirror member.

* * * * *